US006768221B2

(12) United States Patent
Klinger et al.

(10) Patent No.: US 6,768,221 B2
(45) Date of Patent: Jul. 27, 2004

(54) ELECTRICAL LOAD MANAGEMENT IN CONJUNCTION WITH IDLE SHUTDOWN

(75) Inventors: Rodney J. Klinger, Fort Wayne, IN (US); Greg S. Didier, Coldwater, MI (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 270 days.

(21) Appl. No.: 10/074,196

(22) Filed: Feb. 12, 2002

(65) Prior Publication Data

US 2003/0151307 A1 Aug. 14, 2003

(51) Int. Cl.[7] .................................................. B60K 15/00

(52) U.S. Cl. ............................... 307/10.7; 123/198 DC; 180/272

(58) Field of Search .................. 307/10.7; 123/198 DC; 180/272

(56) References Cited

U.S. PATENT DOCUMENTS 4,381,042 A * 4/1983 Perry ......................... 180/272
5,222,469 A * 6/1993 Sutton ................. 123/198 DC

* cited by examiner

*Primary Examiner*—Brian Sircus
*Assistant Examiner*—Roberto J Rios
(74) *Attorney, Agent, or Firm*—Jeffrey P. Calfa; Dennis Kelly Sullivan; Susan L. Lukasik

(57) ABSTRACT

A motor vehicle engine is under control of an engine control system (18) that performs an idle shutdown function to shut down the engine via a programmable output (50) of an electronic module of the control system after the engine has been idling for some amount of time. An ignition switch (14) is turned on and off for signaling the engine control system to turn the engine on and off. Relays (30, 40) are connected between the ignition switch and load circuits of the vehicle electrical system and to the programmable output of the module to allow the load circuits to be fed when the ignition switch is on and the programmable output of the module is not signaling an idle shutdown and to disallow feeding when the programmable output of the module is signaling an idle shutdown.

10 Claims, 1 Drawing Sheet

ELECTRICAL LOAD MANAGEMENT IN CONJUNCTION WITH IDLE SHUTDOWN

FIELD OF THE INVENTION

This invention relates generally to electrical systems of motor vehicles. More particularly, the invention relates to a circuit that prevents battery drain that might otherwise occur after an idling engine has been automatically shut down by an idle shutdown timer.

BACKGROUND AND SUMMARY OF THE INVENTION

Certain motor vehicles that have diesel engines for their motors include idle shutdown timers that shut down the motors when the motors have been idling for some specified amount of time. In some vehicles that have electronic engine control systems, the idle shutdown function is embodied by electronics in an electronic module of the control system.

When an individual, such as the driver, is not present at idle shutdown, the switch that turns the engine on and off will remain on. Such a switch is typically key-operated and is commonly referred to as an ignition switch. Even if a person were present at idle shutdown, he or she might not turn the ignition switch off.

The present invention arises through the recognition that after an engine has been automatically shutdown by an idle shutdown timer, certain electric circuits in the vehicle may remain energized through the ignition switch, consuming energy from one or more DC storage batteries in the vehicle electrical system in the process. An ignition switch that remains on after idle shutdown may therefore cause a battery drain, and if the drain continues long enough, insufficient battery power may be available when it is desired to re-start the engine.

The present invention relates to a circuit that is associated with an ignition switch and an electronic module of an engine control system in a motor vehicle to prevent battery drain caused by the ignition switch remaining on after the idling engine has been automatically shutdown by a shutdown timing function performed by the engine control system.

A preferred embodiment of the inventive circuit employs two relays through which the ignition switch feeds various circuits of the vehicle electrical system when the ignition switch is on and the engine is running. When the engine has been running at idle for some specified amount of time, as monitored by the engine control system, an electronic module of the engine control system operates the relays in a way that causes them to interrupt the feeds to the various electrical system circuits, thereby preventing battery draining that would otherwise occur because of failure to turn the ignition switch off.

The invention provides a cost-efficient solution for avoiding battery draining, and the possible inconvenience of having to jump-start the engine, replace one or more batteries, or perhaps even tow the vehicle.

One general aspect of the invention relates to a motor vehicle comprising an engine whose operation is under control of an engine control system that performs an idle shutdown function to shut down the engine via a programmable output of an electronic module of the control system after the engine has been running in idle without interruption for some amount of time. An ignition switch can be operated on and off for signaling the engine control system to turn the engine on and off. Load circuits are fed through the ignition switch when the ignition switch is on. An interface is connected between the ignition switch and the load circuits and to the programmable output of the module for controlling feeding of the load circuits from the ignition switch by allowing the feeding when the ignition switch is on and the programmable output of the module is not signaling an idle shutdown and by disallowing the feeding when the programmable output of the module is signaling an idle shutdown.

According to a disclosed embodiment of the invention, the interface comprises one or more relays.

Another general aspect of the invention relates to a method for preventing battery drain caused by an ignition switch through which load circuits are fed remaining on after an engine that has been idling continuously in a motor vehicle for some amount of time has been automatically shutdown by an idle shutdown timing function performed by an engine control system. The method comprises programming a programmable output of a module of the engine control system to deliver an idle shutdown signal upon the idle shutdown timing function signaling an idle shutdown. The method further comprises connecting an interface between the ignition switch and the load circuits and to the programmable output of the module to control feeding of the load circuits from the ignition switch by allowing the feeding when the ignition switch is on and the programmable output of the module is not signaling an idle shutdown and by disallowing the feeding upon the programmable output signaling an idle shutdown.

According to a disclosed embodiment of the invention, the method interface comprises operating one or more relays from a condition allowing the feeding to a condition disallowing the feeding when idle shutdown is signaled.

The foregoing, along with further aspects, features, and advantages of the invention, will be seen in the following disclosure of a presently preferred embodiment of the invention depicting the best mode contemplated at this time for carrying out the invention. The disclosure includes a drawing, briefly described as follows.

DESCRIPTION OF THE PREFERRED EMBODIMENT

Figure 1:
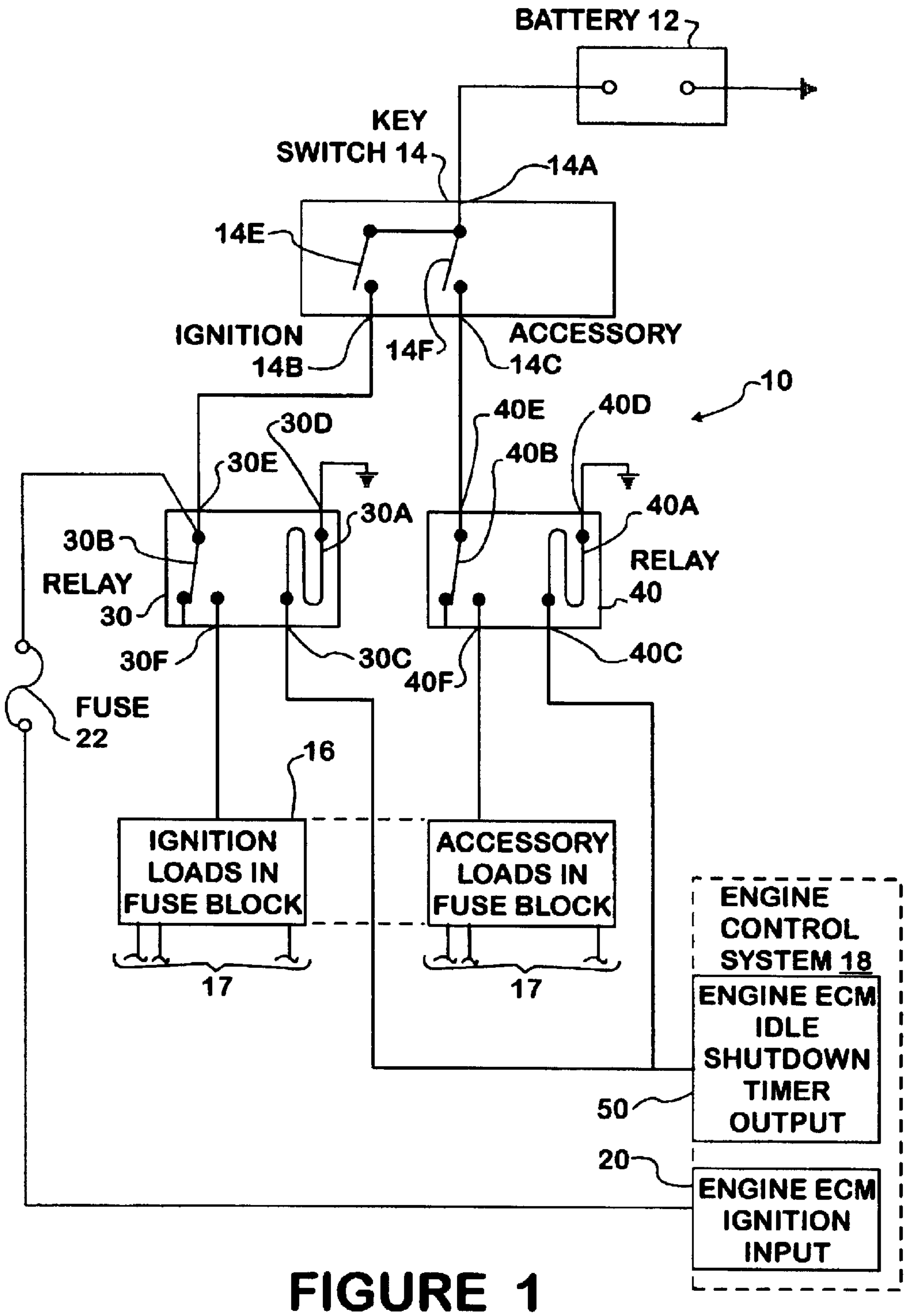
FIG. 1 is a schematic electrical diagram of a preferred embodiment of circuit in a motor vehicle according to principles of the present invention.

FIG. 1 shows a portion of a motor vehicle electrical system 10 that incorporates circuit devices according to principles of the present invention. Electrical system 10 comprises a source of electricity, such as one or more DC storage batteries 12. When the vehicle engine is running, the battery or batteries is or are kept charged by a charging system (not shown).

Running of the engine is under the control of a switch 14 that is typically key-operated and commonly referred to as an ignition switch, even in vehicle whose engine relies on compression of fuel in the engine cylinders for ignition rather than on spark ignition. FIG. 1 shows a positive voltage electrical system where the negative battery pole is grounded and the positive battery pole is connected to one terminal 14A of switch 14. Switch 14 has at least two positions, and often three or four. One position is the OFF position that is illustrated by FIG. 1 where terminal 14A is disconnected from other switch terminals that leading to various load circuits in the vehicle.

FIG. 1 further shows switch 14 to comprise two other terminals 14B and 14C, each of which can be selectively connected to and disconnected from terminal 14A depending on the position to which switch 14 is operated. The particular switch being described here can be operated to any of at least three positions: an OFF position, as shown where neither terminal 14B nor 14C is connected to terminal 14A; an ON, or RUN, position; and an ACCESSORY position. In ON position, switch 14 connects each terminal 14B, 14C to terminal 14A through a respective switch contact 14E, 14F. In ACCESSORY position, switch 14 connects only terminal 14C to terminal 14A via contact 14F.

Prior to incorporation of the invention in the vehicle, terminals 14B, 14C were connected to a fuse block 16 containing various circuit protection devices through which various load circuits 17 in the vehicle are fed. Some of those load circuits are fed through circuit protection devices connected to terminal 14B while others are fed through circuit protection devices connected to terminal 14C. Simply feeding a load circuit does not necessarily mean that current is actually being drawn by that circuit because that circuit may have its own switch or other circuit component that controls the current flow through the circuit.

IF switch 14 also serves to start the engine, it will be operated to a CRANKING position for cranking the engine at starting via an electric cranking motor (not shown). In CRANKING position, switch 14 closes contact 14E, but not contact 14F. The switch has still another terminal and associated contact (not shown) that closes to terminal 14A for cranking the engine, but opens upon release of the switch from CRANKING position when the switch returns to ON position. When the switch returns to ON position, contact 14E remains closed while contact 14F operates from open to closed. In this way, those load circuits that need to be fed while the engine is being cranked will be, but those that would impose an unnecessary drain on the electrical system are not. Once cranking has ceased and the engine has started running under its own power, both ignition and accessory load circuits are fed through switch 14.

The vehicle also has an engine control system 18 that comprises an electronic module, or modules, containing various electronic devices arranged to exercise control over various engine functions on the basis of various data processed by the control system from various sources, including external input sources. One such external input source comes from switch 14 to an ignition input 20 of a module of engine control system 18. That input source is a feed from terminal 14B through a circuit protection device 22. Therefore, closure of contact 14E provides an input signal to engine control system 18 that is processed by the system for enabling the engine to run and for the control system to exercise control over the engine.

A running engine is shut off by operating switch 14 from ON position to OFF position to interrupt the feed from switch 14 to ignition input 20. With the engine off, operation of switch 14 to the ACCESSORY position will close only contact 14F, allowing only accessory load devices to be operated.

One of the functions performed by control system 18 is an idle shutdown function. The system has been programmed with a data value representing an amount of time for which the engine will be allowed to continuously idle. Whenever the engine runs at idle, control system 18 starts the idle timing function by starting a timer. Timing continues as long as the engine remains idling. Off-idle running will reset the timer. Should the engine continue to run in idle without interruption for the amount of the programmed idle time, the timer will time out and cause the engine to shut down. If no one is present at idle shutdown, switch 14 will remain in ON position, and even if someone were present, it might not occur to him or her to turn switch 14 off. As a result, the battery, or batteries, could be drained through one or more of the load circuits because of the failure to turn switch 14 off after idle shutdown.

The invention provides the following solution for avoiding battery draining after idle shutdown. Two relays 30 and 40 are connected between switch 14 and fuse block 16. Each relay 30, 40 comprises a respective coil 30A, 40A and a respective normally open contact 30B, 40B. Terminals 30C, 30D provide for connection of coil 30A in circuit and terminals 30E, 30F provides for connection of contact 30B. Terminals 40C, 40D provide for connection of coil 40A in circuit and terminals 40E, 40F provide for connection of contact 40B.

Although engine control system 18 provides an idle shutdown signal for shutting down the engine, a module of the system that contains programmable outputs must be configured so that an unused one of those programmable outputs is programmed to operate coils 30A, 40A. Such a programmable output is designated by the reference numeral 50 in FIG. 1 and shown connected to relay terminals 30C, 40C. Relay terminals 30D, 40D are grounded. In this way, relay coils 30A, 40A will be energized only when an energizing voltage for them is delivered to output 50 by control system 18.

Terminal 30E of relay 30 is wired to terminal 14B of switch 14, and terminal 30F to ignition load circuits at fuse block 16 Terminal 40E of relay 40 is wired to terminal 14C of switch 14, and terminal 40F to accessory load circuits at the fuse block.

When switch 14 is operated to close contact 14E, the voltage signal applied to ignition input 20 will cause control system 18 to deliver energizing voltage for coils 30A, 40A to output 50. This causes both relay contacts 30B, 40B to operate from open to closed, thereby feeding both the ignition load circuits and the accessory load circuits from battery 12 through switch 14. This condition will continue as long as switch 14 remains on, and idle shutdown does not occur. When switch 14 is turned off, the loss of voltage at ignition input 20 causes system 18 to discontinue the voltage at output 50. Coils 30A, 40A then de-energize, opening contacts 30B, 40B, to interrupt the feeds to the idle and accessory load circuits. With the feeds interrupted, no devices in those circuits that require current can operate.

If the engine has been running in idle without interruption for the amount of the programmed idle time, the idle shutdown timer will time out and cause the engine to shut down. Control system 18 also discontinues the voltage at output 50, causing coils 30A, 40A to de-energize. This opens contacts 30B, 40B, interrupting the feeds to the idle and accessory load circuits so that no devices in those circuits that require current can operate. In this way, the invention prevents those circuits from potentially draining the battery should ignition switch 14 remain on for an extended time after the idle shutdown.

It is believed that the invention can be advantageous for owners and operators of trucks because it can avoid having to call for service should the battery be drained because the ignition switch has been left on after an idle shutdown. It can also avoid the potential application of low voltages to the electric system as the battery drains.

While a presently preferred embodiment of the invention has been illustrated and described, it should be appreciated that principles of the invention are applicable to all embodiments that fall within the scope of the following claims.

What is claimed is:

1. A motor vehicle comprising:

an engine whose operation is under control of an engine control system that performs an idle shutdown function to shut down the engine via a programmable output of an electronic module of the control system after the engine has been running in idle without interruption for an amount of time programmed in the module as measured from the commencement of running in idle;

an ignition switch that can be operated on and off for signaling the engine control system via a feed from the ignition switch to an ignition input of the module to turn the engine on and off, load circuits that are fed through the ignition switch when the ignition switch is on;

and an interface that is connected between the ignition switch an the load circuits and to the programmable output of the module for controlling feeding of the load circuits from the ignition switch by allowing the feeding when the ignition switch is on and the programmable output of the module is not signaling an idle shutdown and by disallowing the feeding when the programmable output of the module is signaling an idle shutdown, wherein the interface excludes the feed from the ignition switch to the ignition input of the module.

2. A motor vehicle as set forth in claim 1 in which the interface comprises one or more relays.

3. A motor vehicle as set forth in claim 2 in which the ignition switch comprises an ignition terminal and an accessory terminal, one relay interfaces the ignition terminal with some of the load circuits, and another relay interfaces the accessory terminal with other load circuits.

4. A motor vehicle as set forth in claim 3 in which both relay are energized when allowing the feeding and de-energized when disallowing the feeding.

5. A motor vehicle as set forth in claim 4 in which each relay comprises a coil having a terminal connected to the programmable output of the module.

6. A method for preventing battery drain caused by an ignition switch through which load circuits are fed remaining on after an engine that has been idling continuously in a motor vehicle for an amount of time, as measured from the commencement of running in idle, has been automatically shutdown by an idle shutdown timing function performed by an engine control system, the method comprising:

programming a programmable output of a module of the engine control system to deliver an idle shutdown signal upon the idle shutdown timing function having measured the amount of time and thereupon signaling an idle shutdown;

connecting an interface between the ignition switch and the load circuit and to the programmable output of the module to control feeding of the load circuits from the ignition switch by allowing the feeding when the ignition switch is on and th programmable output of the module is not signaling an idle shutdown and by disallowing the feeding upon the programmable output signaling an idle shutdown, wherein the step of connecting an interface excludes any connection that would interrupt a feed from the ignition switch of an ignition input of the module via which the ignition switch signals the engine control system to turn the ignition on and off.

7. A method as set forth in claim 6 in which the step of connecting an interface between the ignition switch and the load circuits and to the programmable output of the module interface comprises connecting one or more relays between the ignition switch and the load circuits and to the programmable output of the module.

8. A method as set forth in claim 7 in which the step of connecting one or more relays between the ignition switch and the load circuits and to the programmable output of the module comprises connecting a contact of one relay between some of the load circuits and an ignition terminal of the ignition switch and connecting a contact of another relay between other load circuits and an accessory terminal of the ignition switch.

9. A method as set forth in claim 8 including the steps of energizing coils of both relays to allow the feeding and de-energizing the coils to disallow the feeding.

10. A method as set forth in claim 9 including the step of connecting a terminal of each coil to the programmable output of the module.

* * * * *